UNITED STATES PATENT OFFICE.

LAURITZ ALEXANDER SCHIÖTTZ-CHRISTENSEN, OF COPENHAGEN, DENMARK.

PREPARING YEAST FOR BREAD-MAKING.

SPECIFICATION forming part of Letters Patent No. 579,809, dated March 30, 1897.

Application filed January 6, 1893. Renewed December 9, 1896. Serial No. 615,073. (No specimens.) Patented in Sweden December 14, 1891, No. 4,013, and in Denmark December 17, 1891, No. 3,225.

*To all whom it may concern:*

Be it known that I, LAURITZ ALEXANDER SCHIÖTTZ-CHRISTENSEN, cand. pharm., lieutenant, a subject of the King of Denmark, residing at Copenhagen, in the Kingdom of Denmark, have invented certain new and useful Improvements in the Manufacture of Bread by Means of Pure, Cultivated Yeast, (for which I have obtained a patent in Sweden, No. 4,013, bearing date December 14, 1891, and in Denmark, No. 3,225, bearing date December 17, 1891;) and I do hereby declare the following to be a full, clear, and exact description of the invention, such as will enable others skilled in the art to which it appertains to make and use the same.

My invention relates to the manufacture of a pure yeast for use in bread-making.

In order to make my yeast, I proceed as follows: Malt and flour of wheat or rice, &c., are mixed with water, so as to form a gruel. This mixture is sterilized by being kept at a temperature of 72° centigrade for a period of about two and one-half hours. During this treatment the mixture is kept within a closed copper vessel tinned on the inside and supplied with a tightly-closing cover. The temperature should be maintained as uniform as possible and is preferably regulated by the use of an ordinary thermostat. When the sterilization has been completed, the material is quickly cooled in any convenient way and to it is added a pure culture of *Saccharomyces cerevisiæ*, preferably prepared according to the known method of Dr. Christian E. Hansen. After the addition of this pure yeast the material is maintained at fermenting temperature, which should be maintained as constant as possible. The product thus obtained can be used either in its original form without separation of the yeast from the mash, in which case three kilos of yeast will be sufficient to ferment two hundred kilos of flour, or the yeast can be separated by means of a centrifugal machine, in which case it is obtained in the form of a mass of a firm consistence.

In using the yeast from which no liquid has been separated three kilos of liquid yeast are stirred with water or milk at about 28° centigrade and are added to about one hundred kilos of flour. This mixture is left at a temperature of about 15° centigrade from six to eight hours, after which the treatment of the dough is completed in the usual manner, salt being added to the mixture and the balance of the two hundred kilos of flour. The temperature of the mixing should not exceed 22° centigrade.

It will be observed that in my preparation of pure yeast I do not heat the material in which the yeast is cultured to the boiling-point. By thus keeping the temperature to the lowest limit at which sterilization is effected the albuminoids of the flour are not coagulated, which feature is of advantage in the subsequent fermentation of the material after the addition of the pure yeast.

What I claim is—

1. In the art of producing yeast the improvement which consists in making a mixture of malt, water and cereal flour maintaining this mixture at a temperature of about 72° centigrade in a closed vessel for a sufficient length of time to effect sterilization without coagulating the albuminoids, then adding pure-culture yeast and allowing the mixture to ferment as and for the purpose described.

2. In the art of producing yeast the improvement which consists in making a mixture of malt, water and cereal flour maintaining this mixture at about 72° centigrade in a closed vessel for a sufficient length of time to effect sterilization without coagulating the albuminoids and then adding pure-culture yeast fermenting the mixture and then separating a large part of the liquid constituents, as and for the purpose described.

In testimony whereof I affix my signature in presence of two witnesses.

LAURITZ ALEXANDER SCHIÖTTZ-CHRISTENSEN.

Witnesses:
 CARL GEORG ANDERSEN,
 LAURITZ WILHELM NIELSEN.